INVENTOR.
Bernard A. Loomans
Bradley G. Cox
Leon Yablonski

Learman, Learman & McCulloch
ATTORNEYS

INVENTOR.
Bernard A. Loomans
Bradley G. Cox
Leon Yablonski

*Learman, Learman & McCulloch*
ATTORNEYS

United States Patent Office

3,380,116
Patented Apr. 30, 1968

3,380,116
MIXING MACHINE DRIVE
Bradley G. Cox, Leon Yablonski, and Bernard A. Loomans, Saginaw, Mich., assignors to Baker Perkins Inc., Saginaw, Mich., a corporation of New York
Filed Oct. 13, 1966, Ser. No. 586,459
9 Claims. (Cl. 18—12)

This invention relates to mixing machines of the type having shafts mounted for reciprocating as well as rotative movement and more particularly to drive mechanisms therefor. Mixers of the character to which we refer are of the general type illustrated in United States Patent No. 3,023,455, granted Mar. 6, 1962, to Herbert G. Geier and Henry F. Irving and include a mixer shaft having interrupted helical threads or flights which coact with radially inwardly projecting teeth on the barrel or housing for the shaft to thoroughly intermix plastic and doughy materials and the like. The machine shown in the patent mentioned is a continuous mixer wherein the material is fed to one end of a mixer barrel and is discharged near an opposite end of the barrel in the form of solidified, homogeneously blended pellets. The drive mechanism disclosed in the aforementioned Geier et al. patent is well suited to what might be termed relatively light machines and has functioned well in service for the assignee of the Geier et al. patent, which is also the assignee of the present invention.

One of the prime objects of the present invention is to provide drive mechanism of simple, economical and reliable nature which is particularly suited to moving a relatively heavier mixer shaft in what might be termed a relatively heavy or larger mixer which requires considerably more power to accomplish its mixing and kneading function.

Other objects and advantages of the invention will be pointed out specifically or will become apparent from the following description when it is considered in conjunction with the appended claims and the accompanying drawings, in which:

Figure 1:
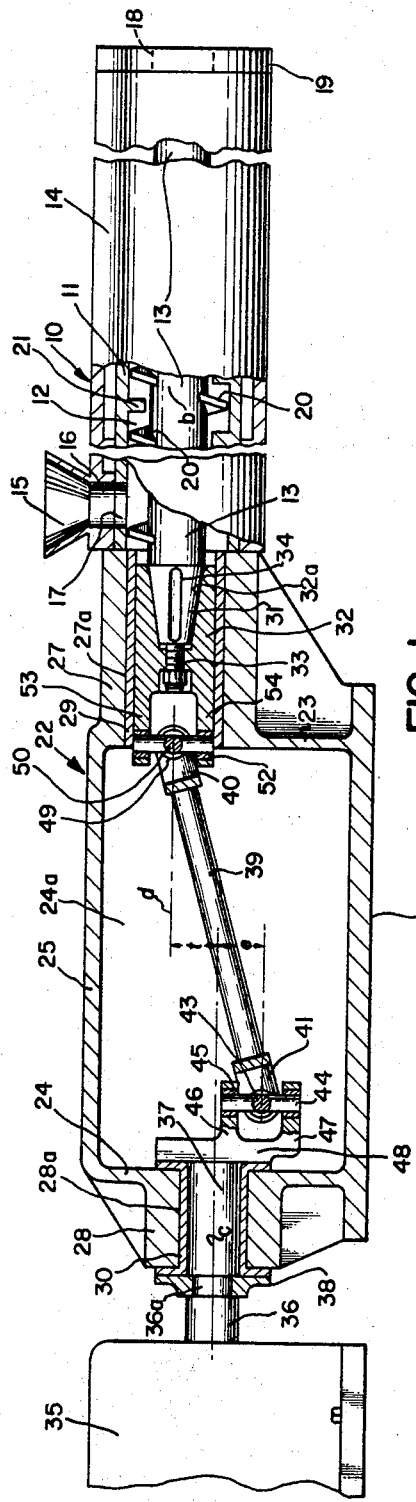
FIGURE 1 is a partly sectional side elevational view particularly illustrating the drive mechanism of my invention.

Referring now more particularly to the accompanying drawings, in which we have illustrated a preferred embodiment of the invention only, a numeral 10 generally refers to the tubular mixing barrel of the mixing machine which includes an inner cylindrical member or casing 11 defining a mixing chamber 12 within which the mixing shaft 13 is operative. A surrounding jacket 14 is provided for the member 11 which can be maintained at different temperature levels by circulating hot or cold fluids through the jacket 14 which may be compartmented in the usual manner so that heating fluid may be circulated through one part of its and cooling fluid through another.

A feed hopper 15 is provided for supplying the materials to be mixed through openings 16 and 17 in the members 14 and 11, respectively, to the mixing an kneading chamber 12 and at the opposite front end of barrel 10 an exit opening 18 may be provided in an end wall 19 to permit the exit of material which has been blended and moved in a forward direction through the mixer. Alternatively, the pelleting mechanism described in the aforementioned Geier et al. patent could be provided at the front end of barrel 10 to deliver the material in the form of pellets.

Provided on the shaft 13 are the interrupted helical threads or blades 20 which coact with the teeth 21 projecting radially inwardly at predetermined locations from the inner peripheral wall of the member 11. As will later become apparent, the mixer shaft 13 is continuously reciprocated and at the same time revolved in a manner so that the teeth 21, during the stroke of the shaft, pass on both the forward and the rearward portions of the stroke through the spaces $b$ between the flight blades 20. For instance, if the threads or blades which form thread portions 20 are interrupted at 180° intervals, then the shaft 13 must rotate 180° during both the forward and the rearward portions of the reciprocatory stroke. In this mixing operation in which the stationary teeth 21 on the barrel actually pass through the interruptions in the thread of the screw, some of the material is always held back by each of the fixed teeth 21 to mix with the material behind. Instead of batches of material being conveyed through the mixer in disk form, the material is conveyed through the mixing and kneading zone 12 enclosed by barrel section 11 in loops and there are no dead spaces in which unmixed material can remain.

Fixed to and supporting the rear end of the mixer barrel 10 is a housing generally designated 22 which includes front and rear walls 23 and 24, respectively, side walls 24a, and top and bottom walls 25 and 26. Bearing support portions 27 and 28 project forwardly and rearwardly, respectively, from the housing 25, as shown particularly in FIGURE 1, and may be bored as at 27a and 28a to receive bearing members 29 and 30, respectively. It will be observed that the shaft 13 includes a section 31 which is tapered and is received in the frusto-conical bore 32a of a mixer shaft section 32 to which it is fixed by a threaded lug and nut assembly 33. The shaft section 32 of shaft 13 is rotated about an axis $d$ and is also reciprocated by mechanism to be presently described. The portion 31 may also be keyed to the shaft section 32 of shaft 13 as at 34.

At the rear extremity of the mixer, a speed reducer 35 is provided which has an output shaft 36 as shown, the speed reducer 35 being connected in the usual manner with a suitable electric motor of the required capacity. Connected with the shaft 36 is a shaft portion 37 which is journaled for rotary movement by the bearing 30 about an axis $c$ and drives the shaft section 32. It will be observed that output shaft 36 has a reduced diameter portion 36a and that a collar member 38 fixed to the shaft portion 36a positively prevents any axial movement of shaft portion 37.

Figure 2:
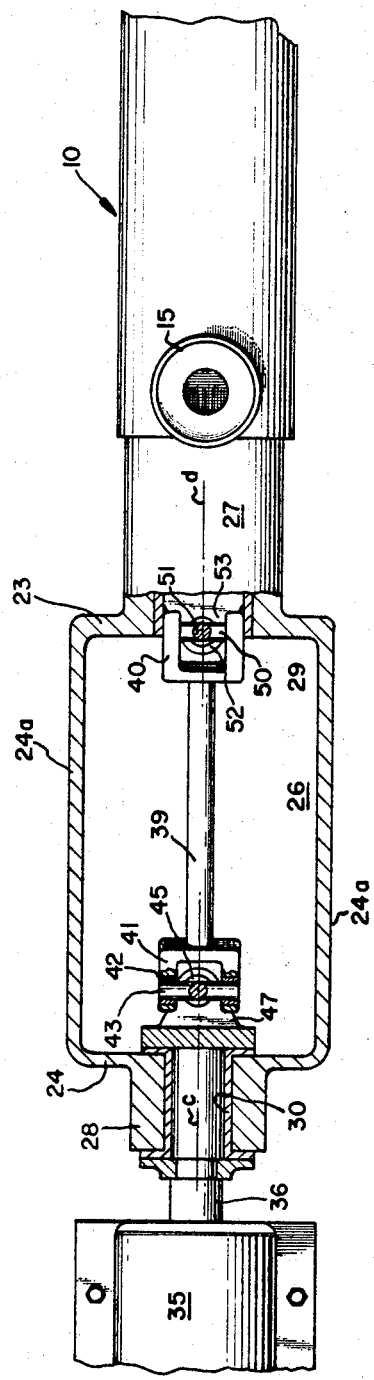
FIGURE 2 is a partly sectional top plan view thereof.

Provided to connect the shaft portion 37 and shaft section 32 is a connecting rod 39 having clevises 40 and 41 at its front and rear ends, respectively. The rear clevis 41 includes bearings 42 (see FIGURE 2) which journal a lateral pin 43, and the lateral pin 43 has integral vertically projecting pin portions 44 journaled by bearings 45 provided in the bifurcated portions 46 and 47 of an axially offset universal joint mounting 48 which is integrated with the shaft portion 37. The front clevis 40 has similar bearings 49 journaling a lateral pin 50 which has integral vertically projecting pin portions 51 journaled in bearings 52 provided in the bifurcated portions 53 and 54 of shaft section 32. The radial distance $e$ from the axis $c$ of shaft portion 37 to the axis of pin 43 is equal to the distance $f$ between the vertically parallel axes $c$ and $d$ of shaft section 37 and shaft section 32, respectively. In the manner illustrated, the connecting rod 39 is thus universally connected to the shaft portion 37 and also universally connected to shaft section 32.

In the operation of the mixer, material is fed continuously through hopper 15 into the mixing chamber 12 and discharged from the exit 18. The rotary movement of shaft section 37 is so transmitted by the connecting rod 39 that shaft 13 is continuously reciprocated and rotated in a manner to coact with the teeth 21 and accomplish a very thorough and intimate kneading and mixing of the material in chamber 12. It is important that the axes $c$ and $d$ be parallel and lie in the same vertical plane, and further that the connecting rod 39 by universally connected to the transmitting drive shaft portion 37 and to the driven shaft section 32.

Figure 3:
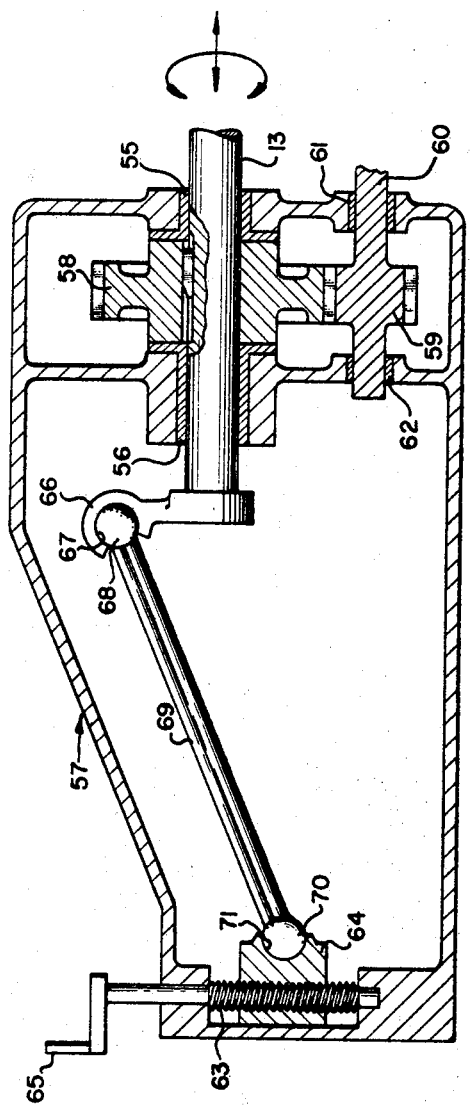
FIGURE 3 is a fragmentary, sectional, side elevational view illustrating a further development.

In FIGURE 3 we have shown a modified embodiment of the invention wherein the mixer shaft 13 is journaled by bearings 55 and 56 in a drive housing generally designated 57 and is driven by a pinion gear 58 in mesh with a drive gear 59 on a drive shaft 60 which connects to the speed reducer and motor, shaft 60 being journaled by similar bearings 61 and 62. Mounted at the rear of the housing 57, on a screw shaft 63 which is rotatable but axially fixed, is a block 64 which may be adjusted upwardly or downwardly by manipulating the handwheel 65 provided for shaft 63. The shaft 13 carries a radially offset arm 66 having a ball socket 67 for accommodating the ball joint 68 provided on the one end of rod 69, the other ball joint end 70 of rod 69 being received in a ball socket 71 provided in block 64. As in the previous embodiment of the invention, the axis of the connecting rod 69 lies in the same vertical plane as the axis of shaft 13 when the arm 66 is in the vertical position and plainly the block 64 may be adjusted upwardly or downwardly to vary the length of the axial stroke of shaft 13.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

We claim:

1. In a mixing machine including an axially extending mixer shaft and an axially extending, tubular barrel means for said shaft, advancing and mixing flight means on said shaft; entrance means permitting the introduction of material to be mixed to said barrel means; a drive shaft extending on an axis in axial parallelism with the axis of said mixer shaft and with its axis spaced from the axis of said mixer shaft; motor means driving said drive shaft; and connecting rod means universally connected to said mixer shaft at one end of said rod means and to said drive shaft at the other end of said rod means; said connecting rod means at one end being connected at a spaced eccentric distance from the axis of the shaft to which it connects at that end so that rotation of said drive shaft causes both rotation and reciprocation of said mixer shaft.

2. The combination defined in claim 1 in which said entrance means is at one end of said barrel means and exit means is at the other; and said mixer shaft has a portion extending rearwardly of said entrance means.

3. The combination defined in claim 2 in which bearing means supports said extension portion for reciprocation and rotation.

4. The combination defined in claim 1 in which said drive shaft axis is spaced from the connection to said rod means a distance equal substantially to the spaced distance between the axes of said drive shaft and mixer shaft.

5. The combination defined in claim 1 in which said drive shaft comprises an extended portion of the output shaft of a speed reducer.

6. The combination defined in claim 5 in which housing means is provided at the rear end of said barrel means for said connecting rod means, and bearing means therein supports said extended portion for rotation.

7. The combination defined in claim 1 in which the universal connection between said mixing shaft and rod means and the universal connection between said rod means and drive shaft includes pin means at right angles at each connection having cruciform axes in parallelism with the cruciform axes of like pin means at the other connection.

8. In a mixing machine including an axially extending shaft and an extender, tubular barrel means for said shaft forming a mixing chamber therearound; advancing and mixing flight means on said shaft; entrance means permitting the introduction of material to be mixed to said barrel means; and means for driving said shaft in a rotary and reciprocatory path including connecting rod means universally connected to said mixer shaft at one end of said rod means and also universally connected at its other end; said connecting rod means at each of said ends being connected at a spaced eccentric distance from the axis of the shaft.

9. The combination defined in claim 8 in which said connecting rod means at its said other end is connected to a block; and means is provided for adjusting said block toward and away from said axis in a direction normal to said axis.

References Cited

UNITED STATES PATENTS

| 3,090,992 | 5/1963 | Schlachter et al. |
| 3,165,807 | 1/1965 | Berliner et al. _____ 25—11 |

FOREIGN PATENTS

| 874,677 | 8/1961 | Great Britain. |
| 1,134 | 1963 | Japan. |

WILLIAM J. STEPHENSON, *Primary Examiner.*